US012022261B2

(12) United States Patent
Candelore et al.

(10) Patent No.: US 12,022,261 B2
(45) Date of Patent: Jun. 25, 2024

(54) HEARING AID IN-EAR ANNOUNCEMENTS

(71) Applicant: Sony Group Corporation, Tokyo (JP)

(72) Inventors: Brant Candelore, Poway, CA (US); Mahyar Nejat, La Jolla, CA (US)

(73) Assignee: SONY GROUP CORPORATION, Tokyo (JP)

( * ) Notice: Subject to any disclaimer, the term of this patent is extended or adjusted under 35 U.S.C. 154(b) by 285 days.

(21) Appl. No.: 17/693,142

(22) Filed: Mar. 11, 2022

(65) Prior Publication Data

US 2023/0292061 A1 Sep. 14, 2023

(51) Int. Cl.
*H04R 25/00* (2006.01)

(52) U.S. Cl.
CPC ....... *H04R 25/505* (2013.01); *H04R 2225/43* (2013.01)

(58) Field of Classification Search
CPC .............. H04R 25/505; H04R 2225/43; H04R 2225/39; H04R 2225/55; H04R 25/305
See application file for complete search history.

(56) References Cited

U.S. PATENT DOCUMENTS 8,526,649 B2 * 9/2013 Foo ...................... H04R 25/554 381/315
2020/0296521 A1 9/2020 Wexler
2022/0021985 A1 * 1/2022 Wexler .................... G10L 25/51

FOREIGN PATENT DOCUMENTS

EP 3905007 A1 11/2021
WO WO-2006003618 A1 1/2006
WO WO-2021023667 A1 2/2021

* cited by examiner

*Primary Examiner* — Tuan D Nguyen
(74) *Attorney, Agent, or Firm* — Trellis IP Law Group, PC

(57) ABSTRACT

Implementations generally relate to hearing aids. In some implementations, a method includes receiving outside sound at a hearing aid. The method further includes amplifying the outside sound. The method further includes generating an in-ear announcement. The method further includes providing the in-ear announcement, wherein the in-ear announcement is at a higher volume level than the outside sound.

20 Claims, 6 Drawing Sheets

600

HEARING AID IN-EAR ANNOUNCEMENTS

CROSS REFERENCE TO RELATED APPLICATIONS

This application is related to U.S. patent application Ser. No. 17/693,139, entitled "HEARING AID FOR ALARMS AND OTHER SOUNDS," filed Mar. 11, 2022, and U.S. patent application Ser. No. 17/693,145, entitled "HEARING AID FOR COGNITIVE HELP USING SPEAKER RECOGNITION," filed Mar. 11, 2022, which are hereby incorporated by reference as if set forth in full in this application for all purposes.

BACKGROUND

Hearing aids assist users with hearing impairments by amplifying sounds to a level that the user can hear. Hearing aids typically detect ambient sounds and amplify all ambient sounds detected based on a user's audio profile or general profile. Hearing aids can have different modes of operation depending on the setting (e.g., restaurant, one-on-one conversation, public park, etc.). Certain audio frequencies are amplified over other frequencies to facilitate the user with the comprehension of speech.

SUMMARY

Implementations generally relate to hearing aids. In some implementations, a system includes one or more processors, and includes logic encoded in one or more non-transitory computer-readable storage media for execution by the one or more processors. When executed, the logic is operable to cause the one or more processors to perform operations including: receiving outside sound at a hearing aid; amplifying the outside sound; generating an in-ear announcement; and providing the in-ear announcement, wherein the in-ear announcement is at a higher volume level than the outside sound.

With further regard to the system, in some implementations, the logic when executed is further operable to cause the one or more processors to perform operations comprising attenuating the outside sound while providing the in-ear announcement. In some implementations, the logic when executed is further operable to cause the one or more processors to perform operations comprising amplifying one or more first components of the outside sound; and attenuating one or more second components of the outside sound. In some implementations, the in-ear announcement comprises at least one message. In some implementations, the in-ear announcement comprises hearing aid control information. In some implementations, the in-ear announcement comprises setting information associated with the hearing aid. In some implementations, the logic when executed is further operable to cause the one or more processors to perform operations comprising providing the in-ear announcement during a moment that is based on at least one predetermined announcement policy.

In some implementations, a non-transitory computer-readable storage medium with program instructions thereon is provided. When executed by one or more processors, the instructions are operable to cause the one or more processors to perform operations including: receiving outside sound at a hearing aid; amplifying the outside sound; generating an in-ear announcement; and providing the in-ear announcement, wherein the in-ear announcement is at a higher volume level than the outside sound.

With further regard to the computer-readable storage medium, in some implementations, the instructions when executed are further operable to cause the one or more processors to perform operations comprising attenuating the outside sound while providing the in-ear announcement. In some implementations, the instructions when executed are further operable to cause the one or more processors to perform operations comprising amplifying one or more first components of the outside sound; and attenuating one or more second components of the outside sound. In some implementations, the in-ear announcement comprises at least one message. In some implementations, the in-ear announcement comprises hearing aid control information. In some implementations, the in-ear announcement comprises setting information associated with the hearing aid. In some implementations, the instructions when executed are further operable to cause the one or more processors to perform operations comprising providing the in-ear announcement during a moment that is based on at least one predetermined announcement policy.

In some implementations, a method includes: receiving outside sound at a hearing aid; amplifying the outside sound; generating an in-ear announcement; and providing the in-ear announcement, wherein the in-ear announcement is at a higher volume level than the outside sound.

With further regard to the method, in some implementations, the method further includes attenuating the outside sound while providing the in-ear announcement. In some implementations, the method further includes: amplifying one or more first components of the outside sound; and attenuating one or more second components of the outside sound. In some implementations, the in-ear announcement comprises at least one message. In some implementations, the in-ear announcement comprises hearing aid control information. In some implementations, the in-ear announcement comprises setting information associated with the hearing aid.

A further understanding of the nature and the advantages of particular implementations disclosed herein may be realized by reference of the remaining portions of the specification and the attached drawings.

DETAILED DESCRIPTION

Implementations generally relate to hear aids, and, in particular, hearing aids that provide in-ear announcements.

As described in more detail herein, in various implementations, a system receives outside sound at a hearing aid. The method further includes amplifying the outside sound. The system further generates an in-ear announcement. The system further provides the in-ear announcement, where the in-ear announcement is at a higher volume level than the outside sound.

Implementations enable the user to receive such in-ear announcements in real-time as the user walks around at home or elsewhere (e.g., around town, etc.). In various implementations, the system provides in-ear announcements so that the user of the hearing aid hears the announcements and other people in proximity do not hear the announcements. This discreetly notifies the user without disturbing other people or interrupting conversation between the user and others, etc.

Figure 1:
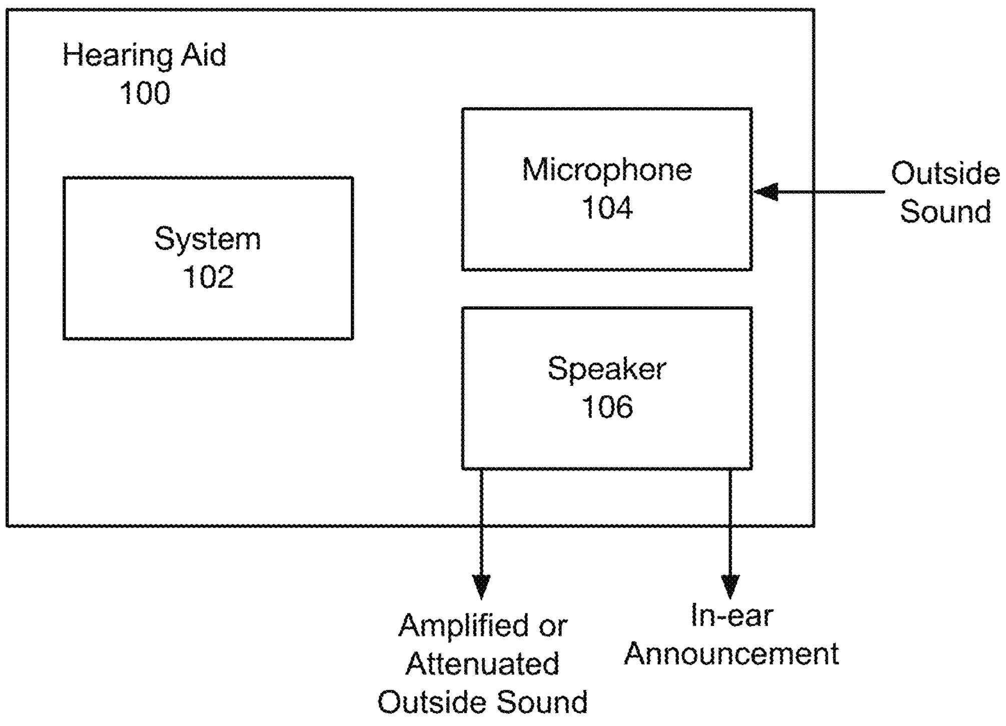
FIG. 1 is a block diagram of an example hearing aid and environment for providing in-ear announcements, which may be used for implementations described herein.

FIG. 1 is a block diagram of an example hearing aid 100 and environment for providing in-ear announcements, which may be used for implementations described herein. As shown, the environment includes hearing aid 100, which includes a system 102, a microphone 104, and a speaker 106.

In various implementations, system 102 of hearing aid 100 may communicate with the Internet directly or via a mobile device such as a smart phone, computer, etc. By enabling hearing aid 100 to be tethered to a mobile device that connects to the Internet or other network, hearing aid 100 may continually stream audio to the Internet for analysis by a web server. System 102 may communicate with the Internet or with another device such as a mobile device via any suitable communication network such as a Bluetooth network, a Wi-Fi network, etc.

As described in more detail herein, system 102 of hearing aid 100 receives outside sounds, which include various types of sounds from the ambient environment. The hearing aid 100 generally amplifies and/or may attenuate detected sounds according to implementations described herein. In various implementations, system 102 provides one or more in-ear announcements to a user wearing hearing aid 100. An in-ear announcement may provide information such as message, hearing aid setting information, etc. Various example types of information provided in in-ear announcements are described in more detail herein.

In some implementations, system 102 attenuates detected sounds in order to enable the user wearing hearing aid 100 to better hear any in-ear announcements provided by system 102. Further implementations directed to operations of hearing aid 100 are described in more detail herein, in connection with FIG. 4, for example.

For ease of illustration, FIG. 1 shows one block for each of system 102, microphone 104, and speaker 106. Blocks 102, 104, and 106 may represent multiple systems, microphones, and speakers, depending on the particular implementation. In other implementations, hearing aid 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

Figure 2A:
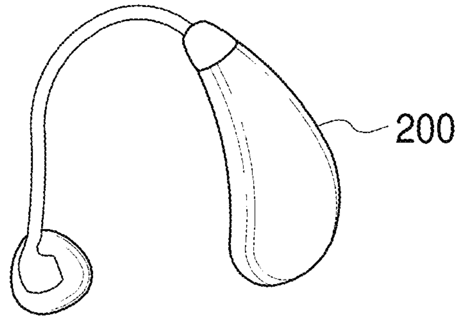
FIG. 2A is an image of an example hearing aid, which may be used for implementations described herein.
Figure 2B:
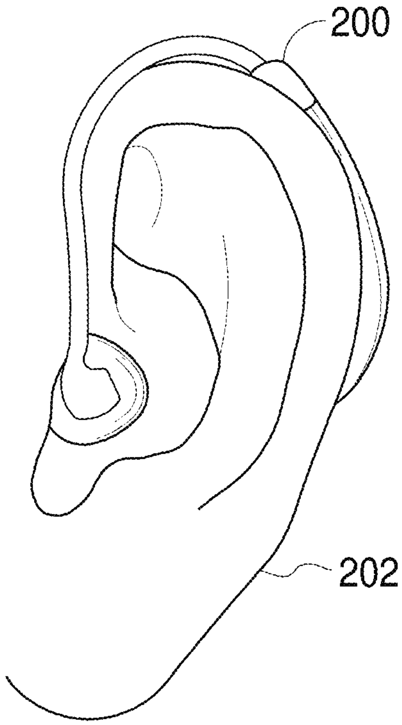
FIG. 2B is an image of a hearing aid worn on an ear, according to some implementations.

FIG. 2A is an image of an example hearing aid 200, which may be used for implementations described herein. FIG. 2B is an image of hearing aid 200 worn on an ear 202, according to some implementations. As shown, hearing aid 200 is worn on the exterior of ear 202 and wraps around the top of ear 202. In various implementation, the hearing aid receiver inserts into the canal of an ear.

Figure 3A:
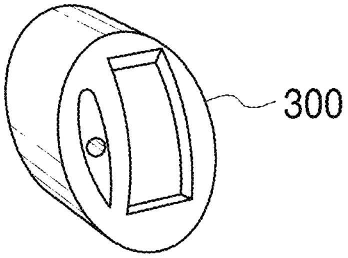
FIG. 3A is an image of an example hearing aid, which may be used for implementations described herein.
Figure 3B:
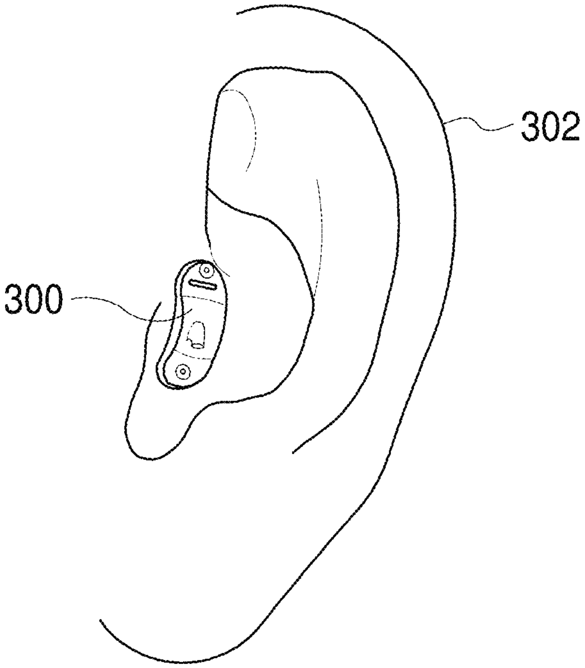
FIG. 3B is an image of a hearing aid worn in the canal of an ear, according to some implementations.

FIG. 3A is an image of an example hearing aid 300, which may be used for implementations described herein. FIG. 3B is an image of hearing aid 300 worn in the canal of an ear 302, according to some implementations. As shown, hearing aid 300 being inserted in the canal of ear 302 is less visible. The hearing aids shown in FIGS. 2A, 2B, 3A, and 3B are example implementations of hearing aid hardware. The particular types of hearing aid hardware may vary, depending on the implementation.

Figure 4:
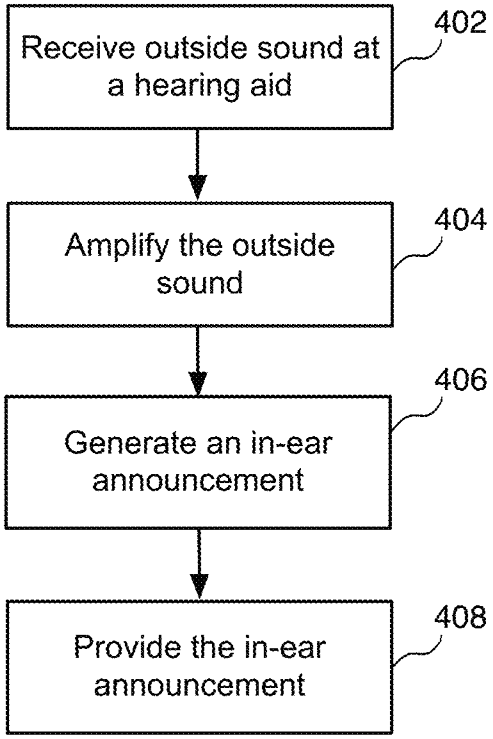
FIG. 4 is an example flow diagram for providing in-ear announcements, according to some implementations.

FIG. 4 is an example flow diagram for providing in-ear announcements, according to some implementations. Referring to both FIGS. 1 and 4, a method is initiated at block 402, where a system such as system 102 receives outside sound at a hearing aid.

At block 404, the system amplifies the outside sound. This enables the user to generally hear sounds amplified by the hearing aid that the user might not otherwise hear.

At block 406, the system generates an in-ear announcement. In various implementations, in-ear announcements may range from reminders, to alerts, to volume settings, to profile changes, to caller-identifications (if linked to a phone), to text messages read aloud, etc.

At block 408, the system provides the in-ear announcement. In various implementations, the system provides the in-ear announcement at a higher volume level than the volume level of the outside sound.

In various implementations, the system attenuates the outside sound while providing the in-ear announcement. This enables the user to better hear in-ear announcements over other sounds. In various implementations, the system amplifies one or more first components of the outside sound. The system then attenuates one or more second components of the outside sound.

In various implementations, the in-ear announcement includes at least one message. Such messages may be verbal messages received from other users (e.g., text messages or emails read aloud, etc.). Messages may also be verbal reminders (e.g., appointments, etc.).

In various implementations, the in-ear announcement includes hearing aid control information. For example, in some implementations, the system may call out particular controls (e.g., volume, etc.) that the user may control via the hearing aid or via a connected mobile device. In various implementations, the in-ear announcement includes setting information associated with the hearing aid. For example, if the user increases or decreases the volume of the hearing aid, the system may announce the current setting (e.g., volume at low or high, volume level, etc.).

In various implementations, the system provides the in-ear announcement during a moment that is based on one or more predetermined announcement policies. For example, in some implementations, a predetermined announcement policy may be to deliver urgent messages immediately. In some implementations, a predetermined announcement policy may be to deliver non-urgent messages at a delayed time (e.g., on the hour, during conversation breaks, etc.). For example, the system may provide some announcements (e.g., non-urgent announcements, etc.) when the system hears silence such as a break in a conversation between the user and another person. In another example, the system may also provide some announcements when the system hears silence such as a break in a television program or music. This enables the system to avoid interfering with conversations or other activities (e.g., watching television, listening to music, etc.).

In some implementations, the system may attenuate or not amplify or filter particular sounds that might not be important for the user to hear. For example, the system may attenuate background noise such as wind, traffic, etc. This enables the user to more easily distinguish between important sounds (e.g., alarms, notifications, announcements, etc.) from less important sounds (e.g., wind, traffic, etc.). The system may utilize any suitable frequency attenuation or noise cancelation techniques.

In some implementations, where the user is wearing a hearing aid in both ears, the system may deliver alarms, notifications, announcements, etc. to the user in the hearing aid of one ear and not the other hearing aid. This enables the system to deliver different types of information simultaneously. In such scenarios, the system may increase the volume of alarms, notifications, and announcements to be at higher level than other ambient sounds.

As indicated above, the system may establish communication between the hearing aid and a mobile device, and also access an Internet via the mobile device. As such, the system enables the hearing aid to send and receive data to and from the Internet via the mobile device. This is beneficial in that the hearing aid may utilize the power and other resources of the mobile device.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Implementations described herein provide various benefits. For example, implementations provide in-ear announcements to a user wearing a hearing aid. Implementations described herein provide in-ear announcements to the user, where in-ear announcements are at a higher volume level than the outside sound in order to enable the user to better hear in-ear announcements.

Figure 5:
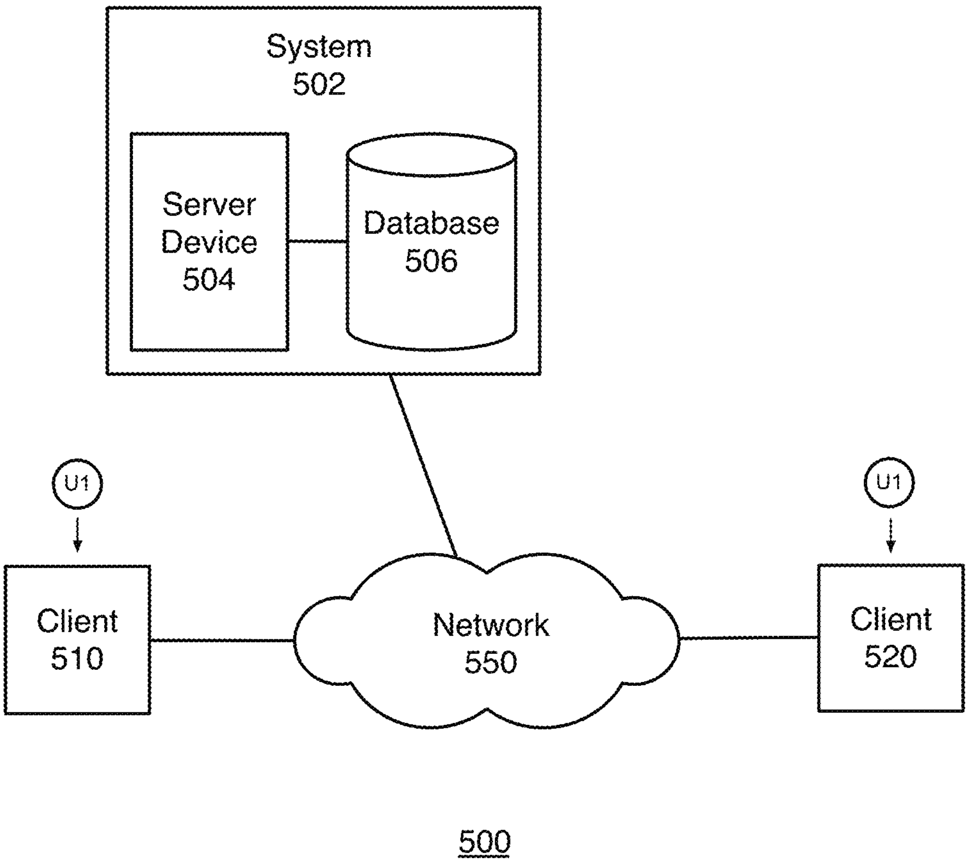
FIG. 5 is a block diagram of an example network environment, which may be used for some implementations described herein.

FIG. 5 is a block diagram of an example network environment 500, which may be used for some implementations described herein. In some implementations, network environment 500 includes a system 502, which includes a server device 504 and a database 506. For example, system 502 may be used to implement a system of a mobile device that communicates with the hearing aid described herein, as well as to perform implementations described herein.

Network environment 500 also includes client devices 510 and 520, which may represent two hearing aids worn by a user U1. For example, one client device may represent a hearing aid for a right ear, and the other client device may represent a hearing aid for a left ear. Client devices 510 and 520 may communicate with system 502 and/or may communicate with each other directly or via system 502. Network environment 500 also includes a network 550 through which system 502 and client devices 510 and 520 communicate. Network 550 may be any suitable communication network such as a Wi-Fi network, Bluetooth network, the Internet, etc.

While system 502 is shown separately from client devices 510 and 520, variations of system 502 may also be integrated into client device 510 and/or client device 520. This enables each of client devices 510 and 520 to communication directly with the Internet or another network.

For ease of illustration, FIG. 5 shows one block for each of system 502, server device 504, and network database 506. Blocks 502, 504, and 506 may represent multiple systems, server devices, and network databases. Also, there may be any number of client devices. In other implementations, environment 500 may not have all of the components shown and/or may have other elements including other types of elements instead of, or in addition to, those shown herein.

While server device 504 of system 502 performs implementations described herein, in other implementations, any suitable component or combination of components associated with system 502 or any suitable processor or processors associated with system 502 may facilitate performing the implementations described herein.

Figure 6:
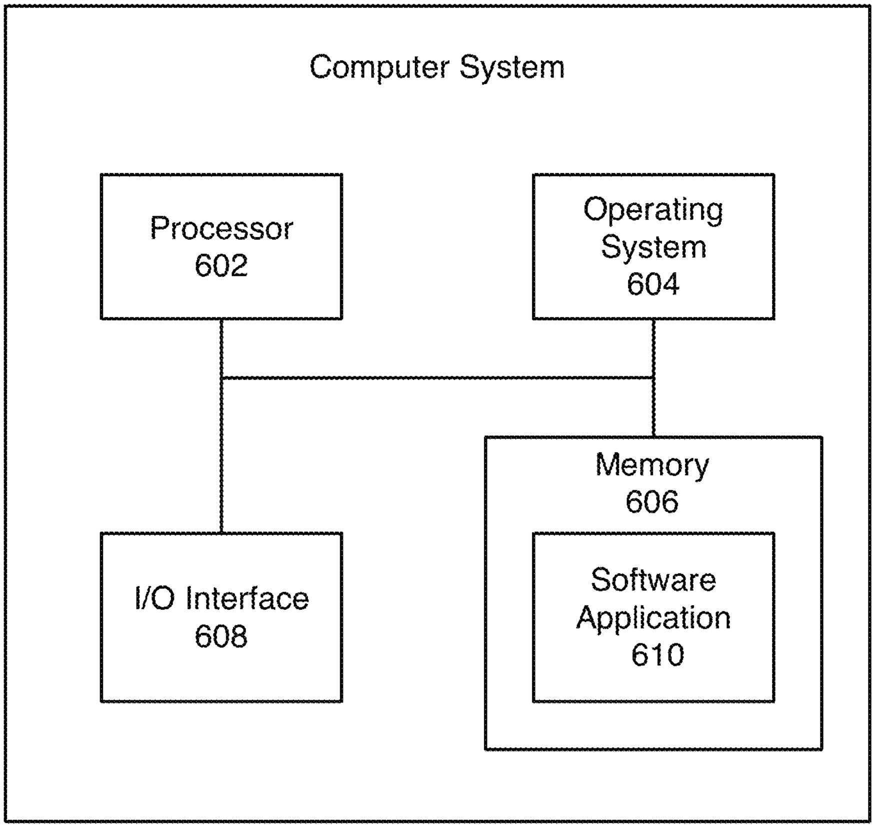
FIG. 6 is a block diagram of an example computer system, which may be used for some implementations described herein.

FIG. 6 is a block diagram of an example computer system 600, which may be used for some implementations described herein. For example, computer system 600 may be used to implement server device 504 of FIG. 5 and/or system 102 of FIG. 1, as well as to perform implementations described herein. In some implementations, computer system 600 may include a processor 602, an operating system 604, a memory 606, and an input/output (I/O) interface 608. In various implementations, processor 602 may be used to implement various functions and features described herein, as well as to perform the method implementations described herein. While processor 602 is described as performing implementations described herein, any suitable component or combination of components of computer system 600 or any suitable processor or processors associated with computer system 600 or any suitable system may perform the steps described. Implementations described herein may be carried out on a user device, on a server, or a combination of both.

Computer system 600 also includes a software application 610, which may be stored on memory 606 or on any other suitable storage location or computer-readable medium. Software application 610 provides instructions that enable processor 602 to perform the implementations described herein and other functions. Software application 610 may also include an engine such as a network engine for performing various functions associated with one or more networks and network communications. The components of computer system 600 may be implemented by one or more processors or any combination of hardware devices, as well as any combination of hardware, software, firmware, etc.

For ease of illustration, FIG. 6 shows one block for each of processor 602, operating system 604, memory 606, I/O interface 608, and software application 610. These blocks 602, 604, 606, 608, and 610 may represent multiple processors, operating systems, memories, I/O interfaces, and software applications. In various implementations, computer system 600 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

Particular implementations may be implemented by using a programmable general purpose digital computer, and/or by using application specific integrated circuits, programmable logic devices, field programmable gate arrays, optical, chemical, biological, quantum or nanoengineered systems, components and mechanisms. In general, the functions of particular implementations can be achieved by any means as is known in the art. Distributed, networked systems, components, and/or circuits can be used. Communication, or transfer, of data may be wired, wireless, or by any other means.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:

one or more processors; and logic encoded in one or more non-transitory computer-readable storage media for execution by the one or more processors and when executed operable to cause the one or more processors to perform operations comprising:

receiving outside sound at a hearing aid;

amplifying the outside sound;

generating an in-ear announcement; and providing the in-ear announcement, wherein the in-ear announcement is at a higher volume level than the outside sound.

2. The system of claim 1, wherein the logic when executed is further operable to cause the one or more processors to perform operations comprising attenuating the outside sound while providing the in-ear announcement.

3. The system of claim 1, wherein the logic when executed is further operable to cause the one or more processors to perform operations comprising:

amplifying one or more first components of the outside sound; and attenuating one or more second components of the outside sound.

4. The system of claim 1, wherein the in-ear announcement comprises at least one message.

5. The system of claim 1, wherein the in-ear announcement comprises hearing aid control information.

6. The system of claim 1, wherein the in-ear announcement comprises setting information associated with the hearing aid.

7. The system of claim 1, wherein the logic when executed is further operable to cause the one or more processors to perform operations comprising providing the in-ear announcement during a moment that is based on at least one predetermined announcement policy.

8. A non-transitory computer-readable storage medium with program instructions stored thereon, the program instructions when executed by one or more processors are operable to cause the one or more processors to perform operations comprising:

receiving outside sound at a hearing aid;

amplifying the outside sound;

generating an in-ear announcement; and providing the in-ear announcement, wherein the in-ear announcement is at a higher volume level than the outside sound.

9. The computer-readable storage medium of claim 8, wherein the instructions when executed are further operable to cause the one or more processors to perform operations comprising attenuating the outside sound while providing the in-ear announcement.

10. The computer-readable storage medium of claim 8, wherein the instructions when executed are further operable to cause the one or more processors to perform operations comprising:

amplifying one or more first components of the outside sound; and attenuating one or more second components of the outside sound.

11. The computer-readable storage medium of claim 8, wherein the in-ear announcement comprises at least one message.

12. The computer-readable storage medium of claim 8, wherein the in-ear announcement comprises hearing aid control information.

13. The computer-readable storage medium of claim 8, wherein the in-ear announcement comprises setting information associated with the hearing aid.

14. The computer-readable storage medium of claim 8, wherein the instructions when executed are further operable to cause the one or more processors to perform operations comprising providing the in-ear announcement during a moment that is based on at least one predetermined announcement policy.

15. A computer-implemented method comprising:

receiving outside sound at a hearing aid;

amplifying the outside sound;

generating an in-ear announcement; and providing the in-ear announcement, wherein the in-ear announcement is at a higher volume level than the outside sound.

16. The method of claim 15, further comprising attenuating the outside sound while providing the in-ear announcement.

17. The method of claim 15, further comprising:

amplifying one or more first components of the outside sound; and attenuating one or more second components of the outside sound.

18. The method of claim 15, wherein the in-ear announcement comprises at least one message.

19. The method of claim 15, wherein the in-ear announcement comprises hearing aid control information.

20. The method of claim 15, wherein the in-ear announcement comprises setting information associated with the hearing aid.

* * * * *